March 18, 1958     A. H. STERLING     2,826,803
SERRATING DEVICES
Filed March 14, 1956
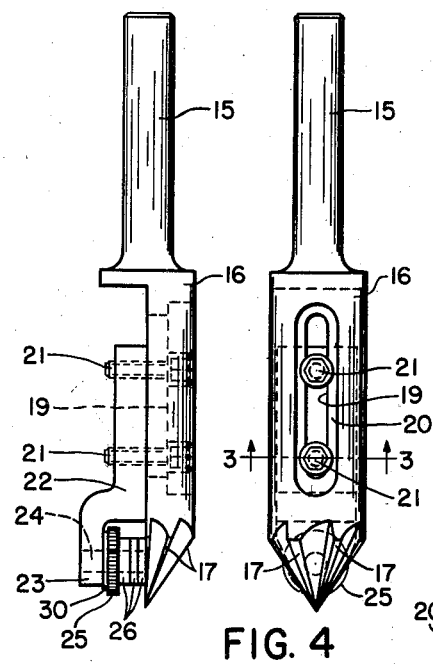
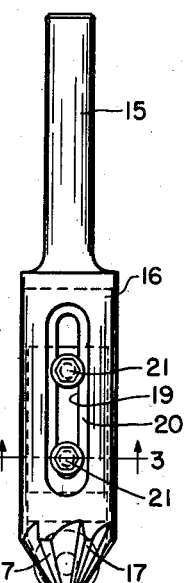
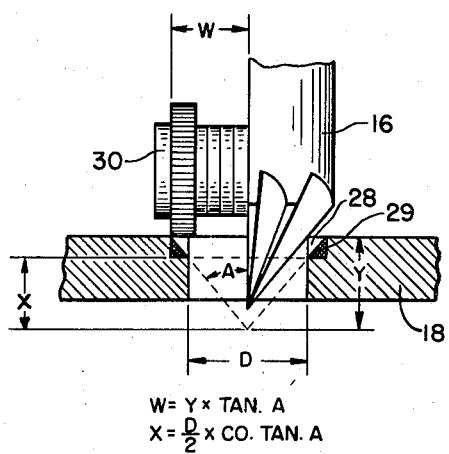
$W = Y \times \tan A$
$X = \dfrac{D}{2} \times \cot A$
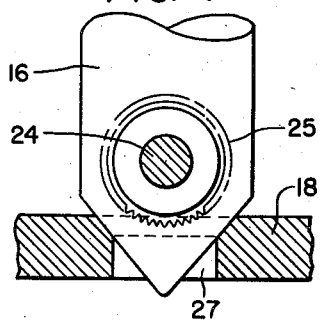
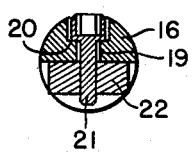
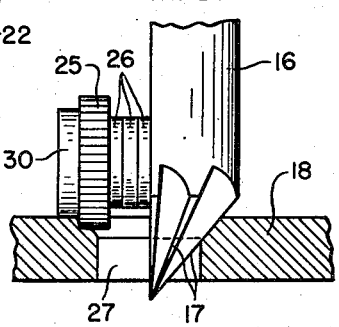
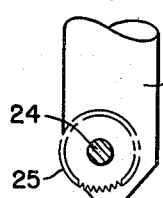
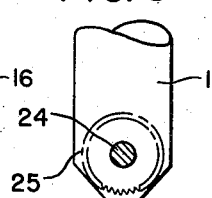
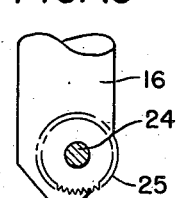
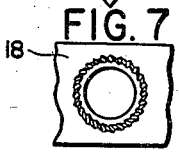
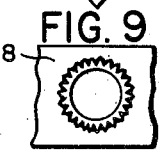
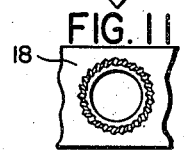
INVENTOR
ALBERT H. STERLING
BY *Pearl Benst*
*Henry Silbereis*
HIS ATTORNEYS

United States Patent Office 2,826,803
Patented Mar. 18, 1958

2,826,803
SERRATING DEVICES

Albert H. Sterling, Dayton, Ohio

Application March 14, 1956, Serial No. 571,555

8 Claims. (Cl. 29—103)

This invention relates to improvements in a combined countersink and serrating tool.

The principal object of the invention is to provide a tool for countersinking a hole in a work piece, and cutting interlocking serrations in the surface of the countersunk hole, during a single operation.

Another object of the invention is to provide a tool which may be attached to a conventional drill press, for countersinking a hole in a work piece and cutting interlocking serrations in the surface of the countersunk hole, during a single operation.

Still another object of the invention is to provide a tool for cutting serrating spirals clockwise, counter clockwise, or in a criss-cross pattern by a simple adjustment of the serration cutter on the tool.

Another object of the invention is to provide a tool for cutting serrating spirals either clockwise, counter clockwise, or in a criss-cross pattern, while rotating the tool in a single direction.

A specific object of the invention is to provide a tool for simultaneously cutting a countersink and serrations in a work piece with a gauge for accurately controlling the depth of the countersink and the serrating spiral cuts.

With these and incidental objects in view, the invention includes certain novel features of construction and combinations of parts, a preferred form or embodiment of which is hereinafter described with reference to the drawings which accompany and form a part of this specification.

Fig. 1 is an elevational view of the tool for countersinking and serrating the countersink.

Fig. 2 is an elevational view of the tool viewed from the righthand side of Fig. 1.

Fig. 3 is a cross-sectional view taken on line 3—3 of Fig. 2, and looking in the direction of the arrows.

Fig. 4 is a schematic view showing the relation of the serration-cutting wheel to the countersink, and is illustrated with the parts in positions just after the cutting wheel begins to form the serrations.

Fig. 5 is a side view of the Fig. 4 schematic illustration.

Fig. 6 illustrates the cutting wheel located to the left of center of the countersink cutter.

Fig. 7 illustrates the shape of the serrations cut when the cutter is located as illustrated in Fig. 6.

Fig. 8 illustrates the cutter wheel located on the center line of the countersink cutter.

Fig. 9 illustrates the shape of the serrations cut when the cutting wheel is located as illustrated in Fig. 8.

Fig. 10 illustrates the cutting wheel located to the right of center of the countersink cutter.

Fig. 11 illustrates the shape of the serrations cut when the cutting wheel is located as illustrated in Fig. 10.

Fig. 12 is an enlarged view, illustrating the relative location and sizes of the parts of the combined tool to countersink and serrate the hole, and shows the area of the material in which the serrations are cut in criss-cross hatching, together with formulas for determining the location of the cutting wheel in respect to the countersink.

General description

The combined tool illustrated herein is devised to countersink a hole and serrate the countersunk portion of the hole in various patterns during a single machine operation. The novel tool can cut serrations in one of three general patterns, that is, with the swirls formed either righthand, lefthand, or in a criss-cross pattern.

The serrating cutter is formed in the shape of a cutting wheel, having the cutting teeth formed parallel to its axis. The number of teeth formed on the cutting wheel is determined by the type of serrations required; that is, whether the serrations are to be coarse or fine.

A bridge is adjustably mounted on the countersinking tool, which bridge supports the cutting wheel in such a manner that the cutting wheel can be moved on the center line of the countersinking tool with respect to the point of countersinking tool or pivoted thereon to shift the center of the cutting tool either to the right or to the left of the center line of the tool.

To accurately locate the cutter wheel sidewise in respect to the countersinking tool, spacers of various thicknesses are provided, which may be placed on either one or both sides of the cutting wheel. To obtain the best results the surface of the cutting wheel farthest from the center line of the countersinking tool should be so located that it engages the countersunk portion of the hole at the point of intersection thereof, with the surface of the material being countersunk. If W equals the distance from the center of the countersinking tool to the farthest wall of the cutting wheel and Y equals the depth of the deepest penetration of the countersink tool, and the angle of the countersink tool equals A, then $$W \text{ equals } Y \tan. A$$

The setting of the cutter wheel in relation to the tip of the countersink tool should be as follows: Let this distance equal X and the diameter of the hole to be countersunk equal D. Then $$X \text{ equals } \frac{D}{2} \text{ Cotang. } A$$

These formulas are indicated in Fig. 12.

These formulas are considered to be the best as determined by experiment. However W can be varied to suit any given condition.

The object of forming serrations in the countersunk part of the hole is well understood in the art of riveting metal parts together and is to provide a better anchor for the parts when so riveted together. In the prior art the serrations are conventionally formed by punches, and a separate punch must be provided for each size and shape of serrations.

In the present novel construction the serrations of various formations and sizes can be obtained with a single tool, due to the fact that the supporting bridge for the cutting wheel is adjustable to meet varying requirements, and the cutter is also adjustable in respect to the countersink tool per se by spacing it in respect to the center line of the countersinking tool. This latter adjustment makes it feasible to use the same cutter for holes of a plurality of different diameters.

The cutting wheel is reversible, due to the fact that the outer edge of the cutting wheel carries the largest load, and if these edges become too dull for further use the wheel can be reversed to position the unused edges of the cutting wheel to cutting position. This gives the cutter double life and requires fewer replacements.

A gauge is provided on the side of the cutting wheel to limit the extent to which the cutting wheel can enter the countersunk hole.

*Detailed description*

The novel tool illustrated herein includes an arbor 15 insertable into a conventional chuck of a drill press. The main body 16 of the tool is semi-circular in cross-section, as shown in Fig. 3, and the end thereof has a plurality of cutting edges 17 formed thereon, which cutting edges are formed at the angle desired for the countersink to be cut in the work piece 18.

The body 16 is provided with a slot 19 having a ledge 20 formed around the perimeter thereof. The slot 19 receives two screws 21, having shouldered heads which seat on the ledge 20 and the screws 21 are secured in the threaded holes of a bridge 22, adjustably mounted on the flat surface of the semi-circular section of the body 16. The slot 19 is wider than the diameter of the screws 21 to permit sidewise movement of the bridge 22 on the body 16, for a purpose to be later described. The bridge 22 is offset at 23 and carries a stud 24 on the offset portion thereof. The stud is of sufficient length to engage the flat surface of the body 16. A cutting wheel 25, having a plurality of cutting edges thereon, is rotatably mounted on the stud 24.

To accurately space the cutting wheel 25 from the body 16, a plurality of spacers 26 of various thickness are provided, which are placed on the stud 24 in accordance with the requirement of the work to be performed. The location of the cutting wheel on the stud 24 is determined by the equation shown in Fig. 12, and mentioned above, and is controlled by the point of deepest penetration Y (Fig. 12) of the cutting edges 17 into the work piece 18.

The sidewise adjustment of the cutting wheel 25 in respect to the center line of the body 16 is determined by the direction of the serrations to be cut. For example, if the serrations are to be as illustrated in Fig. 7, the wheel 25 is shifted to the left (Fig. 6) of the center line of the body 16. If the serrations are to be cut as illustrated in Fig. 11, the cutting wheel 25 is shifted to the right (Fig. 10) of the center line of the body 16. If on the other hand a crisscross serration is to be formed, as illustrated in Fig. 9, the cutting wheel 25 is located on the center line of the body 16.

After the bridge has been adjusted in accordance with the two factors W and X, and in accordance with the pattern of serrations desired, the screws 21 are tightened to clamp the bridge 22 in place on the body 16.

To facilitate accurate location of the bridge 22 on the body 16, gauges may be provided which can be set by a micrometer, as is well known in the art.

After the cutting wheel 25 has been properly clamped to the body 16, the assembled unit is placed in the chuck of a drill press and the drilled piece of work placed on the table thereof.

As the cutting edges 17 enter the hole 27 in the work piece, they start cutting the countersink, and the cutting wheel immediately thereafter starts to cut the serrations in the countersink. The material cut away by the countersink is illustrated by the unshaded section 28 of Fig. 12, the material in which the serrations are formed is indicated by the double cross-section area 29 (Fig. 12).

As is well known in the art, serrations are cut in the countersink to provide a stronger connection between the part and on a piece to be riveted thereto. In the prior art serrations are usually cut by a die which is hammered into the countersink, thus requiring a separate die for each formation of serrations desired. Also, it required two operations to obtain the desired results, namely, first a countersink was formed in the work piece and then the serrations were cut by a die. In the novel tool disclosed herein, a single tool is provided for simultaneously countersinking holes of a plurality of sizes and serrating the countersinks in a plurality of patterns in a single operation, thus eliminating the necessity of supplying a large number of dies. The simple adjustment described above obtains a wide variety of serrated countersinks, both as to form and direction of patterns.

A gauging disk 30 is provided on the cutter 25, which limits the extent of movement of the countersink 16 and the cutting wheel 25 into the work piece, thus controlling the depth of the countersink and serrations.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. A combined countersink and serrating tool, comprising an arbor for attaching the tool to the chuck of a drill press, a countersink, a bridge adjustably mounted on the countersink, and a cutting wheel mounted on the bridge adjacent the countersink, said bridge adapted to be adjusted sidewise in respect to the longitudinal center line of the countersink, whereby a hole in a work piece can be countersunk and serrations of a plurality of patterns can be formed in the countersunk hole when the tool is engaged with a work piece and rotated by the drill press.

2. A device for forming serrations in the countersunk hole of a workpiece and having an arbor for attaching the device to the chuck of a drill press, a bridge carried by the arbor, a cutting wheel rotatably mounted on the bridge, and means to adjust the bridge on the arbor sidewise with respect to the center line of the arbor, whereby serrations of different patterns can be formed in the countersink of the work piece.

3. A combined countersink and serrating tool for simultaneously countersinking and forming serrations in a hole of a work piece, an arbor for attaching the tool to the chuck of a drill press, a slot longitudinally cut in the arbor, a bridge, clamping means projecting through the slot of the bridge and secured in the bridge, said clamping means freely movable across the slot to provide for sidewise movement of the clamping means in the slot to thereby provide for sidewise adjustment of the bridge in respect to the center line of the arbor, a cutting wheel carried by the bridge, whereby the cutting wheel cuts serrations in a countersunk hole of the work piece in either a righthand, lefthand, or criss-cross pattern when the tool is rotated by the drill press, the pattern cut being controlled by the sidewise position of the cutting wheel on the arbor.

4. A combined countersink and serrating tool for simultaneously countersinking and forming serrations in a hole of a work piece, an arbor for attaching the tool to the chuck of a drill press, a slot longitudinally cut in the arbor, a ledge on the perimeter of the slot, a bridge, screws projecting through the slot and entering tapped holes in the bridge, said slot being wider than the diameter of the screws in the slot to provide for sidewise movement of the screws in the slot, to thereby provide for sidewise movement of the bridge and the cutting wheel in respect to each side of the center line of the arbor, so that the cutting wheel can be located either on said center line, to the left of the center line, or directly on the center line, a shoulder on each screw adapted to engage the ledge on the perimeter of the slot to enable the screws to be set to hold the cutting wheel in one of said three positions, whereby the cutting wheel forms a pattern of serrations in the countersunk hole, which is different for each set position of the cutting wheel in respect to the center line, when the tool is rotated after contacting the work piece.

5. A combined countersink and serrating tool comprising an arbor for attaching the tool to a chuck of a drill press, a countersink on the arbor to countersink a hole in a work piece, a bridge adjustably mounted on the countersink, a cutting wheel carried by the bridge and having a plurality of cutting edges on its periphery, said bridge adapted to be adjusted sidewise in respect to the longitudinal center line of the countersink, whereby serrations of a plurality of patterns can be formed in a countersunk hole when the tool is engaged with a work piece and rotated by the drill press, and a gauging device on the cutting wheel contacting the work piece to control the depth of the serrations.

6. A device for forming serrations in a countersunk hole of a work piece and having an arbor for attaching the device to the chuck of a drill press, a bridge carried by the arbor, a cutting wheel rotatably mounted on the bridge, means to adjust the bridge on the arbor sidewise in respect to the center line of the arbor, whereby serrations of different patterns can be formed in the countersunk hole of the work piece, and a gauging device on the cutting wheel, contacting the work piece to limit the depth of the serrations.

7. A combined countersink and serrating tool for simultaneously countersinking and forming serrations in a hole of a work piece, an arbor for attaching the tool to a chuck of the drill press, a countersink formed on the arbor, a slot longitudinally cut in the arbor, a bridge, clamping means projecting through the slot and secured in the bridge, said clamping means freely movable across the slot to provide for sidewise movement of the clamping means in the slot to thereby provide for sidewise adjustment of the bridge in respect to the center line of the arbor, a cutting wheel carried by the bridge, whereby the cutting wheel cuts serrations in a countersink hole of a work piece in either a righthand, lefthand, or criss-cross pattern, when the tool is rotated by the drill press, the pattern cut being controlled by the sidewise position of the cutting wheel on the arbor, and a gauging device on the cutting wheel contacting the work piece to control the depth of the serrations.

8. A combined countersink and serrating tool for simultaneously countersinking and forming serrations in a hole of a work piece, an arbor for attaching the tool to the chuck of a drill press, a countersink on the arbor, a slot longitudinally cut in the arbor, a bridge, a cutting wheel mounted on the bridge, screws projecting through the slot and entering tapped holes in the bridge, said slot being wider than the diameter of the screws in the slot to provide for sidewise movement of the screws in the slot to thereby provide for adjusting the bridge and the cutting wheel in respect to each side of the center line of the arbor, so that the cutting wheel can be located either to the right of the center line, to the left of the center line, or directly on the center line, a shoulder on each screw adapted to engage a ledge on the perimeter of the slot to enable the screws to be set to hold the cutting wheel in one of said set positions, whereby the cutting wheel forms a pattern of serrations in a countersunk hole, of the work piece which is different for each set position of the cutting wheel in respect to the center line when the tool is rotated after contacting the work piece, and a gauging device on the cutting wheel contacting the work piece to limit the movement of the cutting wheel into the work piece to control the depth of the serrations.

References Cited in the file of this patent

UNITED STATES PATENTS

| 692,028 | Page | Jan. 28, 1902 |
| 1,485,471 | Smith | Mar. 4, 1924 |
| 1,687,759 | Gouverneur | Oct. 16, 1928 |
| 2,416,774 | Rosenblatt | Mar. 4, 1947 |

FOREIGN PATENTS

| 118,177 | Great Britain | Aug. 22, 1918 |